United States Patent [19]

Hanson

[11] Patent Number: 4,923,489
[45] Date of Patent: May 8, 1990

[54] LIQUID LEVEL CONTROLLER

[76] Inventor: Eric O. Hanson, P.O. Box 991, Taylorsville, N.C. 28681

[21] Appl. No.: 370,624

[22] Filed: Jun. 23, 1989

[51] Int. Cl.$^5$ .............................................. B01F 3/04
[52] U.S. Cl. .................................................... 55/227
[58] Field of Search ................ 55/227, 226; 261/119.1

[56] References Cited

U.S. PATENT DOCUMENTS

| | | | |
|---|---|---|---|
| 2,403,545 | 7/1946 | Nutting | 261/119.1 |
| 2,931,459 | 4/1960 | Wiles et al. | 55/227 |
| 3,726,065 | 4/1973 | Hausberg et al. | 55/226 |
| 4,290,348 | 9/1981 | Morgan et al. | 55/227 |

Primary Examiner—Tim Miles
Attorney, Agent, or Firm—W. Thad Adams, III

[57] ABSTRACT

A liquid level controller for a waterpan-type spray booth. The controller comprises a normally-open first air pressure sensor and switch for detecting a minimum level of negative static pressure through the restricted opening indicative of ventilation fan operation and for closing the first air pressure sensor and switch to thereby permit a voltage output. A normally-closed second air pressure sensor and switch is provided for sensing a predetermined negative static pressure level indicative of a minimum adequate air flow through the restricted opening for opening the second air pressure sensor and switch to interrupt a current flow through the second sensor and switch. The normally-closed second air pressure sensor is normally closed by the voltage output from the normally-open first air pressure sensor and switch. The first and the second air pressure sensor and switch are operatively connected to a water supply valve. A decrease in negative static pressure resulting from a drop in water level in the water pan and a consequent increase in the size of the restricted opening defined by the water level and washing enclosure returns the normally-closed second air pressure sensor and switch to its normally-closed state. This permits opening of the water supply valve to raise the water level in the water pan. This decreases the size of the restricted opening and increases the negative static pressure to re-open the normally-closed second air pressure sensing and switching means and close the water supply valve.

8 Claims, 2 Drawing Sheets

LIQUID LEVEL CONTROLLER

TECHNICAL FIELD AND BACKGROUND OF THE INVENTION

This invention relates to a liquid level controller. The invention is particularly adapted to be used in a environment where the liquid level is proportional to air flow through a restricted opening, wherein the liquid level determines the degree of restriction. Such an environment is, for example, a waterpan-type spray booth of the type wherein air propelled by a ventilation fan entrains extraneous spray, for example, paint or other types of finishes, from the proximity of the waterpan through a restricted opening. Environmental and health regulations now require toxic and hazardous substances to be removed from air, especially in the vicinity of workers.

The restricted opening of the spray booth is defined by the water level and the bottom edge of a washing enclosure. The air flows through the restricted opening into a washing zone where the extraneous spray is washed from the air into the waterpan. Air is pulled into the washing enclosure by a ventilation fan which creates a negative air pressure flow through the restricted opening.

In order to properly entrain the extraneous spray in the air flow, it is necessary to maintain a proper velocity of air flow through the restricted opening. Since the bottom edge of the washing enclosure is stationary, a drop in water level in the pan as a result of evaporation or any other cause increases the size of the opening and correspondingly decreases the air velocity. Of course, the pan may be observed and filled manually when desired. However, the invention according to this application permits careful, automatic control from a remote location.

SUMMARY OF THE INVENTION

Therefore, it is an object of the invention to provide a liquid level controller.

It is another object of the invention to provide a liquid level controller which permits automatic monitoring and control of a liquid level in a waterpan spray booth.

It is another object of the invention to provide a liquid level controller which will operate only when the ventilation system of the spray booth is operating.

It is another object of the invention to provide a liquid level controller which is remotely operable.

It is another object of the invention to provide a liquid level controller which prevents overfilling caused by wave action in the waterpan or for other reasons.

It is another object of the invention to provide a liquid level controller which is adaptable to be responsive to either negative or positive pressure.

These and other objects of the present invention are achieved in the preferred embodiments disclosed below by providing a liquid level controller for a waterpan-type spray booth of the type wherein air propelled by a ventilation fan entrains extraneous spray from the proximity of the waterpan through a restricted opening defined by the water level and a washing enclosure into a washing zone. In the washing zone the extraneous spray is washed from the air into the waterpan. A negative static pressure proportional to the volume of the restricted opening is applied through the opening.

The controller comprises a normally open first air pressure sensing and switching means for detecting a minimum level of negative static pressure through the restricted opening indicative of ventilation fan operation and for closing the first air pressure sensing and switching means to thereby permit a voltage output.

A normally-closed second air pressure sensing and switching means is provided for sensing a predetermined negative static pressure level indicative of a minimum adequate air flow through the restricted opening for opening the second air pressure sensing and switching means to interrupt a current flow through the second sensing and switching means. The normally-closed second air pressure sensing and switching means is normally closed by the voltage output from the normally-open first air pressure sensing and switching means.

The first and the second air pressure sensing and switching means are operatively connected to a water supply valve. A decrease in negative static pressure resulting from a drop in water level in the water pan and a consequent increase in the size of the restricted opening defined by the water level and washing enclosure returns the normally-closed second air pressure sensing and switching means to its normally-closed state. This permits opening of the water supply valve to raise the water level in the water pan. This decreases the size of the restricted opening and increases the negative static pressure to re-open the normally-closed second air pressure sensing and switching means and close the water supply valve.

According to another preferred embodiment of the invention, the liquid level controller comprises first sensing means for proving operation of the ventilation fan and outputting a signal indicating ventilation fan operation. Second sensing means are provided for sensing an acceptable air pressure flow through the restricted opening and outputting a signal indicating an unacceptable air pressure flow, second sensing means operable only if receiving the signal indicating ventilation fan operation.

A water valve is provided for supplying water to the waterpan; and valve operating means are provided for opening the water valve in response to the signal indicating an unacceptable air pressure flow.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
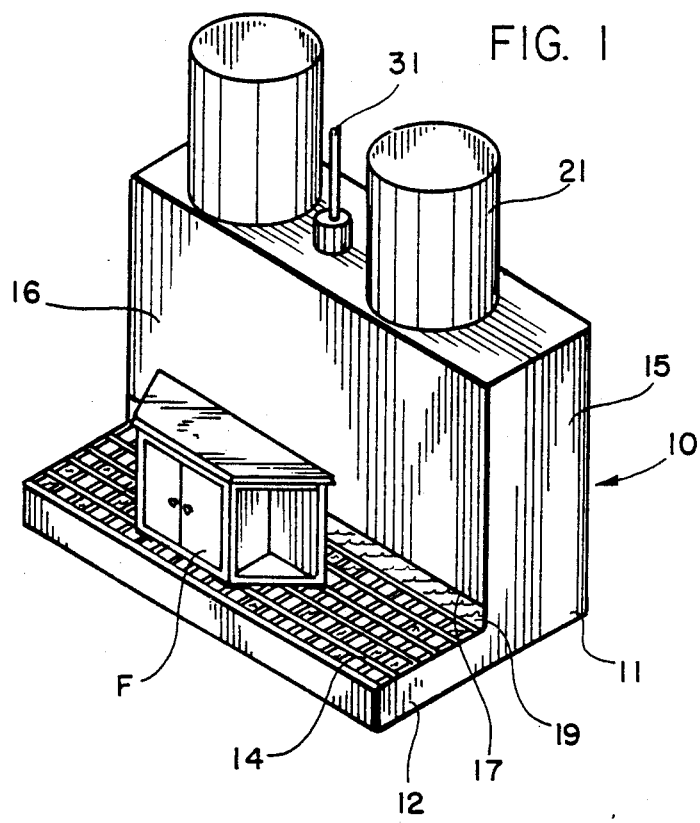
FIG. 1 is a perspective view of a waterpan-type spray booth of a type suitable for use with the liquid level controller of the invention.
Figure 2:
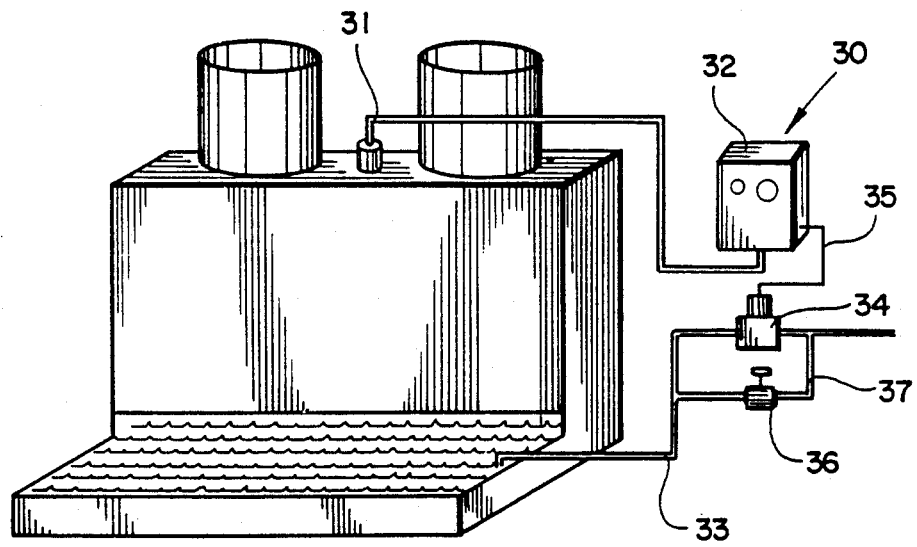
FIG. 2 is a another perspective view of a spray booth, showing the liquid level controller in combination therewith.

Referring now specifically to the drawings, a spray booth of the type used with the liquid level controller according to the present invention is illustrated in FIG. 1 and 2 and shown generally at reference numeral 10. Spray booth 10 is constructed of a sheet metal housing 11, the bottom of which defines a waterpan 12. A grate 14 provides a support for an object, such as a piece of furniture "F", which is being sprayed. Booth 10 includes a washing enclosure 15, the front panel 16 of which extends donwardly towards waterpan 12.

The space between the bottom edge 17 of panel 16 and the level of the water in waterpan 12 defines a restricted opening 19. When the water is at the proper level, the area of the restricted opening 19 is such that air flow through opening 19 is optimum for carrying extraneous spray into the washing enclosure 15.

Figure 3:
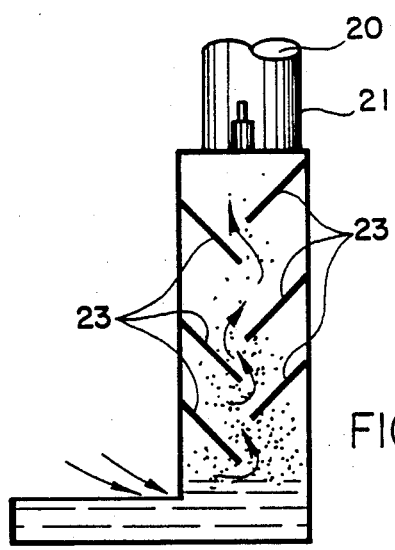
FIG. 3 is a vertical cross-sectional view of the spray booth shown in FIGS. 1 and 2.

The interior structure of booth 10 is shown in simplified form in FIG. 3. Negative air pressure is created in washing enclosure 15 by a ventilation fan 20 in a fan stack 21. Fan stack 21 communicates with washing enclosure 15 through the top and creates a flow of air across the surface of the waterpan 12 and through restricted opening 19. Spray particles are entrained in the air flow and are pulled through opening 19 and up into washing enclosure 15. Baffles 23 divert the air flow and remove the spray particles from the air stream.

Referring again to FIG. 2, liquid level controller 30 is connected to spray booth 10 by a static tap 31. An cabinet 32 contains the operating components of controller 30. Water is supplied to waterpan 12 from a water supply conduit 33 through a solenoid-operated water valve 34 which is controlled by liquid level controller 30 through an electric control wire 35. Water can also be supplied to waterpan 12 by a manual valve 36 through a water supply bypass conduit 37.

Figure 5:
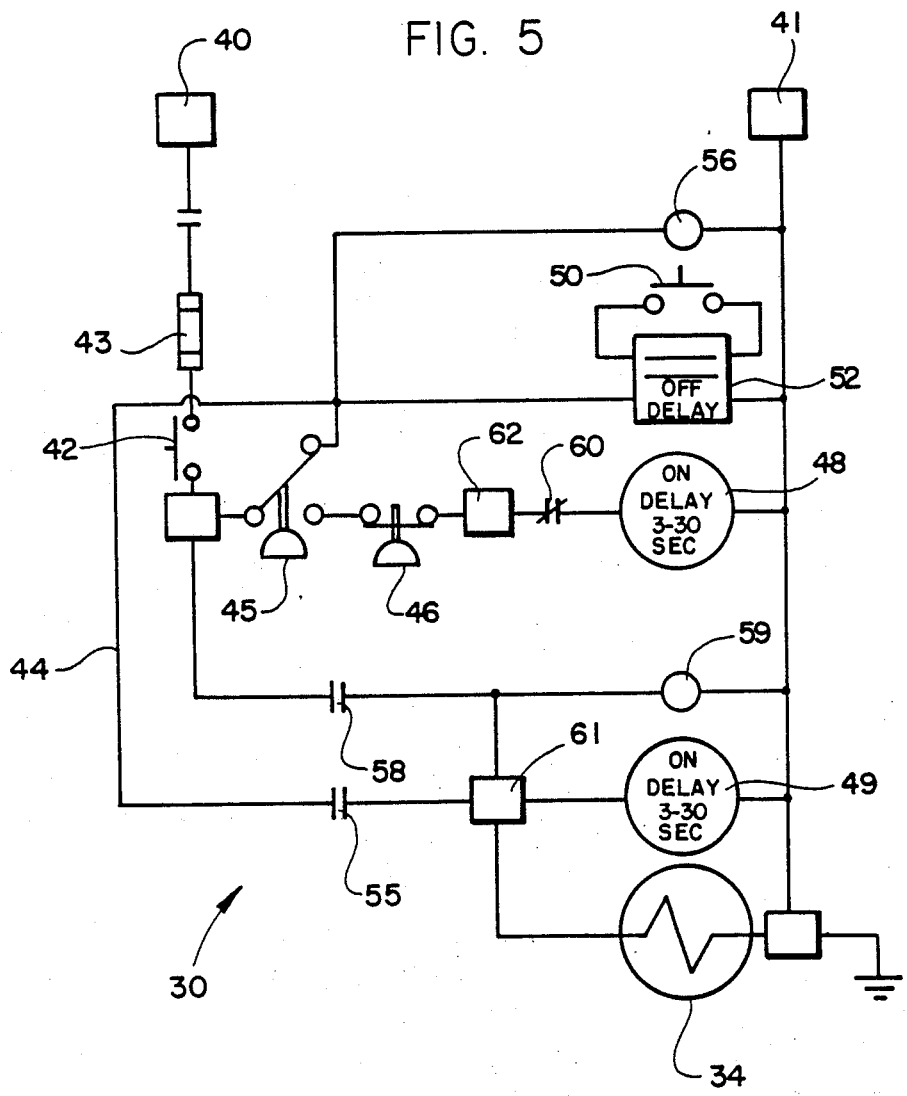
FIG. 5 is a circuit diagram of the liquid level controller.

Operation of liquid level controller 30 is explained by reference to FIG. 5. Alternating line current at 120 volts is supplied through inputs 40, 41. Current input 40 is connected to a ON-OFF switch 42. The controller 10 is protected by a two amp fuse 43. Current is supplied through conventional circuit wiring 44. A normally-open pressure sensor and switch 45 and a normally-closed pressure sensor and switch 46 are placed in series in controller 30.

Figure 4:
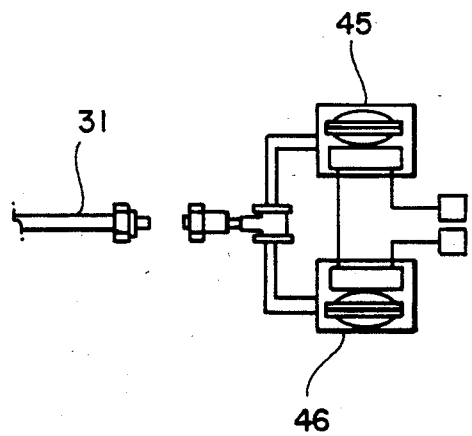
FIG. 4 is a schematic view of the pressure sensing components of the liquid level controller.

Switches 45, 46 operate both electrically and pneumatically. The pneumatic function is illustrated in FIG. 4. Static tap 31 from fan 20 is piped to switches 45 and 46. Static pressure is sensed by switch 45 to prove that the drop in static pressure is not because fan 20 has ceased operating. In other words, switch 45 "proves" that fan 20 is operating. If fan 20 is operating, the static pressure is sufficiently low to cause the contacts in switch 45 to be drawn together into a closed position. The closed switch 45 outputs a voltage to switch 46, which is a normally closed switch and is normally closed by the output voltage from switch 45. Switch 46 also senses negative static air pressure from static tap 21. Sufficiently low static pressure draws the normally-closed contacts of switch 46 into an open position. In this state, with switch 45 closed and switch 46 open the controller 30 is inperative. This state indicates that fan 20 is operating properly and that the level of water in the waterpan 12 is within limits.

Referring again to FIG. 5, when water level drops, the area of the opening into the washing enclosure 15 increases, and thereby decreases the negative static pressure within the booth 10. This decreased negative pressure permits the open contacts of switch 46 to return to their normally-closed state. Current is permitted to flow to a delay timer 48. When the timer 48 has timed out, current is permitted to flow to solenoid valve 34, opening valve 34 and permitting water to flow into waterpan 12. The increased water level increases the negative static pressure, causing the contacts in switch 46 to again open, interruptirg the flow of current, closing solenoid valve 3 and shutting off the flow of water.

Delay timer 48 prevents spurious sensing of a low water level condition due to momentary closures of switch 46 caused by wave action in waterpan 12 and static pressure changes in the environment surrounding booth 10 from other air handling sources. A timer 49 permits a preset fill cycle time.

Manual operation is possible by closing pushbutton contact 50 which latches a relay 51. A timer 52 permits the solenoid valve 34 to be opened for a preset period of time regardless of the condition of switch 46. Manual operation would ordinarily occur when filling the waterpan 12 from an empty or near empty state, or when fan 20 is not operating. If, during a manual filling operation, fan 20 is cut on, the controller 10 automatically begins operation to control the water level in response to changes in static pressure. In this condition switch is open, as is shown in FIG.5.

The operation is explained more fully in connection with the following explanation. Manual operation occurs when fan 20 is not operating but pan 12 never the less needs filling. A desired fill time is set on timer 52 and push button contact 50 is depressed. A coil of timer 52 energizes and a contact 55 closes allowing current to flow from contact 55 to solenoid valve 34. This allows water to fill in to water pan 12 for the period of time set on timer 52. When timer 52 times out, contact 55 opens, de-energizing solenoid valve 34 and stopping water flow. During manual operation an indicator light 56 is lit.

Automatic operation occurs when fan 20 is operating at full speed. Switch 45 closes, allowing current to flow to switch 46. Switch 46 opens, indicating that the water pan 12 is filled to the proper level. When the water level drops, switch 46 closes, permitting current through switch 45 to activate a coil within delay timer 48. During timer 48 operation , contract 58 closes, turning on a "Fill" light 59, energizing solenoid valve 34 to permit water flow and de-energizing a coil in timer 49. Water flow takes place while timer 49 is timing out. Then, a normally-closed contact 60 opens, shutting off delay timer 48 and opening contact 58. Terminal blocks 61, 62 provide test points and expansion connections.

Because controller 30 is electrically and pneumatically operated, a loss of electric current prevents operation. Electric control prevents overfilling of the waterpan 12 which would becaused in non-electric devices by operation in the period after the fan electrical power has been cut off but before the actual blade rotation has stopped.

A liquid level controller is described above. Various details of the invention may be changed without departing from its scope. Furthermore, the fore going description of the preferred embodiment of the invention and the best mode for practicing the invention are provided for the purpose of illustration only and not for the purpose of limitation—the invention being defined by the claims.

I claim:

1. In a liquid level controller for a waterpan-type spray booth of the type wherein air propelled by a ventilation fan entrains extraneous spray from the proximity of the waterpan through a restricted opening defined by the water level and a washing enclosure into a washing zone where the extraneous spray is washed from the air into the water pan, and where in a negative static pressure proportional to the volume of the restricted opening is applied through said opening, the improvement comprising:

(a) a normally-open first air pressure sensing and switching means for detecting aminimum level of negative static pressure through said restricted opening indicative of ventilation fan operation and for closing said first air pressure sensing and switching means to thereby permit a voltage output;

(b) a normally-closed second air pressure sensing and switching means for sensing a predetermined negative static pressure level indicative of a minimum adequate air flow through said restricted opening for opening said second air pressure sensing and switching means to interrupt a current flow through said second sensing and switching means, said normally-closed second air pressure sensing and switching means being normally closed by the voltage out put from said normally-open first air pressure sensing and switching means;

(c) said first and said second air pressure sensing and switching means operatively connected to a water supply valve;

(d) whereby a decrease in negative static pressure resulting from a drop in water level in said water pan and a consequent increase in the size of the restricted opening defined by the water level and washing enclosure returns said normally-closed second air pressure sensing and switching means to its normally-closed state, permitting opening of said water supply valve to raise the water level in said waterpan to there by decrease the size of the restricted opening and increase the negative static pressure to reopen said normally-closed second air pressure sensing and switching means and close said water supply valve.

2. In a liquid level controller according to claim 1, and including delay timing means cooperating with said second normally-closed air pressure sensing and switching means and said water supply valve for delaying opening of said water supply valve for a predetermined interval after closure of said second normally-closed air pressure sensing and switching means.

3. In a liquid level controller according to claim 1, and including means for manually opening and closing said water valve.

4. A liquid level controller for a waterpan-type spray booth of the type wherein air propelled by aventilation fan entrains extraneous spray from the proximity of the waterpan through a restricted opening defined by the water level and a washing enclosure in to a washing zone where the extraneous spray is washed from the air in to the waterpan, and where in a negative static pressure proportional to the volume of the restricted opening is applied through said opening, said controller comprising:

(a) a normally-open first air pressure sensing and switching means for detecting aminimum level of regativestatic pressure through said restricted opening indicative of ventilation fan operation and for closing said first air pressure sensing and switching means to there by permit a voltage output;

(b) a normally-closed second air pressure sensing and switching means for sensing a predetermined negative static pressure level indicative of aminimum adequate air flow through said restricted opening for opening said second air pressure sensing and switching means to interrupt a current flow through said second sensing and switching means, said normally-closed second air pressure sensing and switching means being normally closed by the voltage output from said normally-open first air pressure sensing and switching means;

(c) said first and said second air pressure sensing and switching means operatively connected to a water supply valve;

(d) whereby a decrease in negative static pressure resulting from a drop in water level in said waterpan and a consequent increase in the size of the restricted opening defined by the water level and washing enclosure returns said normally-closed second air pressure sensing and switching means to its normally-closed state, permitting opening of said water supply valve to raise the water level in said water pan to there by decrease the size of the restricted opening and increase the negative static pressure to reopen said normally-closed second air pressure sensing and switching means and close said water supply valve.

5. A liquid level controller according to claim 4, and including delay timing means cooperating with said second normally-closed air pressure sensing and switching means and said water supply valve for delaying opening of said water supply valve for a predetermined interval after closure of said second normally-closed air pressure sensing and switching means.

6. A liquid level controller according to claim 4, and including means for manually opening and closing said water valve.

7. A liquid level controller for a water pan-type spray booth of the type wherein air propelled by a ventilation fan entrains extraneous spray from the proximity of the water pan through a restricted opening defined by the water level and a washing enclosure in to a washing zone where the extraneous spray is washed from the air in to the water pan, and wherein a negative static pressure proportional to the volume of the restricted opening is applied through said opening, said controller comprising;

(a) first sensing means for proving operation of said ventilation fan and outputting a signal indicating ventilation fan operation;

(b) second sensing means for sensing a minimum acceptable negative air pressure flow through said restricted opening and outputting a signal indicating a less than an acceptable negative air pressure flow, second sensing means operable only if receiving said signal indicating ventilation fan operation;

(c) a water valve for supplying water to said waterpan; and (d) valve operating means for opening said water valve in response to said signal indicating a less than acceptable negative air pressure flow.

8. A liquid level controller for a waterpan-type spray booth of the type wherein air propelled by a ventilation fan entrains extraneous spray from the proximity of the waterpan through a restricted opening defined by the water level and a washing enclosure in to a washing zone where the extraneous spray is washed from the air in to the waterpan, and wherein a static pressure proportional to the volume of the restricted opening is applied through said opening, said controller comprising:

(a) first sensing means for proving operation of said ventilation fan and outputting a signal indicating ventilation fan operation;

(b) second sensing means for sensing an acceptable air pressure flow through said restricted opening and outputting a signal indicating an unacceptable air pressure flow, second sensing means operable only if receiving said signal indicating ventilation far operation ;

(c) a water valve for supplying water to said waterpan; and (d) valve operating means for opening said water valve in response to said signal indicating an unacceptable air pressure flow.

* * * * *